(12) United States Patent
Loreskar et al.

(10) Patent No.: US 10,856,146 B2
(45) Date of Patent: Dec. 1, 2020

(54) ELECTRONIC DEVICE VERIFICATION

(71) Applicant: Trustonic Limited, Cambridge (GB)

(72) Inventors: Chris Loreskar, Haverdal (SE);
Thomas Nyman, Helsinki (FI)

(73) Assignee: Trustonic Limited, Cambridge (GB)

( * ) Notice: Subject to any disclaimer, the term of this patent is extended or adjusted under 35 U.S.C. 154(b) by 172 days.

(21) Appl. No.: 15/888,119

(22) Filed: Feb. 5, 2018

(65) Prior Publication Data
US 2018/0248873 A1     Aug. 30, 2018

(30) Foreign Application Priority Data

Feb. 24, 2017 (GB) .................................. 1703010.7
Mar. 23, 2017 (GB) .................................. 1704619.4

(51) Int. Cl.
| | | |
|---|---|---|
| H04L 29/06 | (2006.01) | |
| H04W 12/06 | (2009.01) | |
| G06F 16/955 | (2019.01) | |
| H04W 4/08 | (2009.01) | |
| H04L 12/24 | (2006.01) | |

(Continued)

(52) U.S. Cl.
CPC .......... *H04W 12/06* (2013.01); *G06F 16/955* (2019.01); *H04L 9/0825* (2013.01); *H04L 9/0894* (2013.01); *H04L 9/321* (2013.01); *H04L 9/3226* (2013.01); *H04L 9/3236* (2013.01); *H04L 9/3247* (2013.01); *H04L 9/3271* (2013.01); *H04L 41/0869* (2013.01); *H04L 41/0893* (2013.01); *H04L 63/065* (2013.01); *H04L 63/08* (2013.01); *H04L 63/0876* (2013.01); *H04L 63/104* (2013.01); *H04W 4/08* (2013.01);

(Continued)

(58) Field of Classification Search
CPC ......... H04L 9/32; H04L 9/321; H04L 9/3236; H04L 9/3247; H04L 63/08; H04L 63/0876; H04L 63/10; H04L 63/104; H04W 12/06
See application file for complete search history.

(56) References Cited

U.S. PATENT DOCUMENTS 10,389,733 B2 *  8/2019  Fasoli ................... H04L 63/166
10,440,561 B2 * 10/2019  Bush ..................... H04W 60/00
(Continued)

FOREIGN PATENT DOCUMENTS

WO   WO 2005/084107    9/2005
WO      2015/172352   11/2015

OTHER PUBLICATIONS

Combined Search and Examination Report for GB1704619.4 dated Sep. 15, 2017, 7 pages.

(Continued)

*Primary Examiner* — Khang Do
(74) *Attorney, Agent, or Firm* — Nixon & Vanderhye P.C.

(57) ABSTRACT

A method for verifying whether an electronic device is one of a group of known devices comprises receiving verification information indicative of a first device identifier accessible from storage circuitry by a predetermined process executed by the electronic device and a second device identifier inaccessible from the storage circuitry by the predetermined process. A device database retains valid pairings of the first and second device identifiers for the group of known devices. The device database is looked up based on the verification information to determine whether the first and second device identifiers correspond to one of the valid parings.

18 Claims, 5 Drawing Sheets

(51) Int. Cl.
*H04W 4/80* (2018.01)
*H04L 9/32* (2006.01)
*H04L 9/08* (2006.01)
*H04W 4/70* (2018.01)
*H04W 12/00* (2009.01)

(52) U.S. Cl.
CPC ............... *H04W 4/80* (2018.02); *H04W 4/70* (2018.02); *H04W 12/00522* (2019.01)

(56) References Cited

U.S. PATENT DOCUMENTS

| | | | | |
|---|---|---|---|---|
| 2013/0145160 A1* | 6/2013 | Bursell | ............... | G06F 21/6218 713/168 |
| 2014/0053281 A1* | 2/2014 | Benoit | ................ | H04L 12/2809 726/29 |
| 2014/0115340 A1* | 4/2014 | Lee | ......................... | H04L 63/08 713/182 |
| 2015/0113592 A1* | 4/2015 | Curtis | .................. | H04L 63/0823 726/2 |
| 2015/0195241 A1* | 7/2015 | Haitani | ................. | G06F 3/0482 715/752 |
| 2016/0073260 A1 | 3/2016 | Moberg | | |
| 2016/0171206 A1* | 6/2016 | Von Bokern | .......... | H04L 63/102 726/1 |
| 2016/0371438 A1* | 12/2016 | Annulis | .................. | G06F 21/32 |
| 2017/0026187 A1* | 1/2017 | Ramatchandirane | ....................... | H04L 9/3268 |
| 2017/0060637 A1* | 3/2017 | Persson | .................. | C09D 11/50 |
| 2017/0195884 A1* | 7/2017 | Kang | ..................... | H04L 63/10 |
| 2017/0323121 A1* | 11/2017 | Liu | ......................... | G06F 21/57 |

OTHER PUBLICATIONS

Office Action for EP Application No. 18151872.1 dated May 28, 2020, 5 pages.

* cited by examiner

ELECTRONIC DEVICE VERIFICATION

This application claims priority to GB Patent Application No. 1703010.7 filed Feb. 24, 2017 and GB Patent Application No. 1704619.4 filed Mar. 23, 2017, the entire contents of each of which are hereby incorporated by reference.

The present technique relates to verifying whether an electronic device is one of a group of known devices.

Increasingly, electronic devices are being used to access services which may involve handling of potentially sensitive information, such as mobile banking, access to healthcare services or handling of employment details for example. Also, with the increasing development of the Internet of Things, it is becoming more common for systems such as heating, air conditioning or street lighting to be controlled based on information provided by electronic devices which may provide sensor information such as temperature data or information sensed to give an indication of whether a user is present. In these scenarios, it can be important for a service provider to verify that the electronic device with which it is communicating is one of a certain known group of known devices. For example, verifying that the device is one of a known group can give confidence that data gathered by the electronic device can be trusted or that the electronic device will handle information securely. It may be desired to check that the device meets some property, such as being made in a particular factory or by a certain trusted manufacturer, or that it has a particular hardware configuration (e.g. the presence of a trusted execution environment or other security mechanism at the platform level) which enables trust in the device. Note that this device verification may be separate from any verification of a user of the device. While a user's verification may verify the user as authentic even when they switch devices, the device authentication may be specific to one particular hardware device regardless of which user is using that device.

Device verification typically relies on injection of secret cryptographic keys into the device during the manufacturing of the device. However, secure key provision during manufacturing requires additional hardware in the factory lines and increases manufacturing time. Also, the manufacturing cost of providing the key provision infrastructure may not be justified for some relatively inexpensive devices.

At least some examples provide a method for verifying whether an electronic device is one of a group of known devices, comprising:

receiving verification information indicative of a first device identifier accessible from storage circuitry by a predetermined process executed by the electronic device and a second device identifier inaccessible from said storage circuitry by said predetermined process; and looking up a device database representing valid pairings of said first device identifier and said second device identifier for said group of known devices, to determine whether the first device identifier and the second device identifier for the electronic device correspond to one of said valid pairings.

At least some examples provide an enrolment server, comprising:

communication circuitry to receive verification information indicative of a first device identifier accessible from storage circuitry by a predetermined process executed by an electronic device and a second device identifier inaccessible from said storage circuitry by said predetermined process;

storage circuitry to store a device database representing valid pairings of said first device identifier and said second device identifier for a group of known devices; and processing circuitry to lookup the device database to determine whether the first device identifier and the second device identifier for the electronic device correspond to one of said valid pairings.

At least some examples provide a method for providing verification information for verifying whether an electronic device is one of a group of known devices, the method comprising:

obtaining first data dependent on a first device identifier accessible from storage circuitry by a predetermined process executed by the electronic device;

obtaining second data dependent on a second device identifier inaccessible from said storage circuitry by said predetermined process; and transmitting verification information indicative of the first data and the second data to an enrolment server for verifying whether the first device identifier and the second device identifier corresponds to a valid pairing for one of said group of known devices.

At least some examples provide an apparatus for providing verification information for verifying whether an electronic device is one of a group of known devices, the apparatus comprising circuitry configured to:

obtain first data dependent on a first device identifier accessible from storage circuitry by a predetermined process executed by the electronic device;

obtain second data dependent on a second device identifier inaccessible from said storage circuitry by said predetermined process; and transmit verification information indicative of the first data and the second data to an enrolment server for verifying whether the first device identifier and the second device identifier corresponds to a valid pairing for one of said group of known devices.

At least some examples provide an electronic device manufacturing process, comprising:

obtaining first data dependent on a first device identifier accessible from storage circuitry by a predetermined process executed by an electronic device;

obtaining second data dependent on a second device identifier inaccessible from said storage circuitry by said predetermined process; and transmitting authentication information dependent on the first data and the second data to an enrolment server for maintaining a database of valid pairings of the first device identifier and the second device identifier for a group of known devices.

At least some examples provide electronic device manufacturing equipment, comprising circuitry to:

obtain first data dependent on a first device identifier accessible from storage circuitry by a predetermined process executed by an electronic device;

obtain second data dependent on a second device identifier inaccessible from said storage circuitry by said predetermined process; and transmit authentication information dependent on the first data and the second data to an enrolment server for maintaining a database of valid pairings of the first device identifier and the second device identifier for a group of known devices.

A computer program may be provided for controlling a data processing apparatus to perform any of the methods described above or the device manufacturing process described above. The computer program may be stored on a storage medium. The storage medium may be a non-transitory storage medium.

Further aspects, features and advantages of the present technique will be apparent from the following description of examples, which is to be read in conjunction with the accompanying drawings, in which:

FIG. 1 schematically illustrates an example of manufacturing equipment for manufacturing an electronic device;

FIG. 2 shows an example of post-manufacture device enrolment;

FIG. 3 schematically illustrates an example of components of the electronic device;

FIG. 4 schematically illustrates an example of components of the enrolment server, an enrolment device, or a collection point in device manufacturing equipment;

Figure 1:
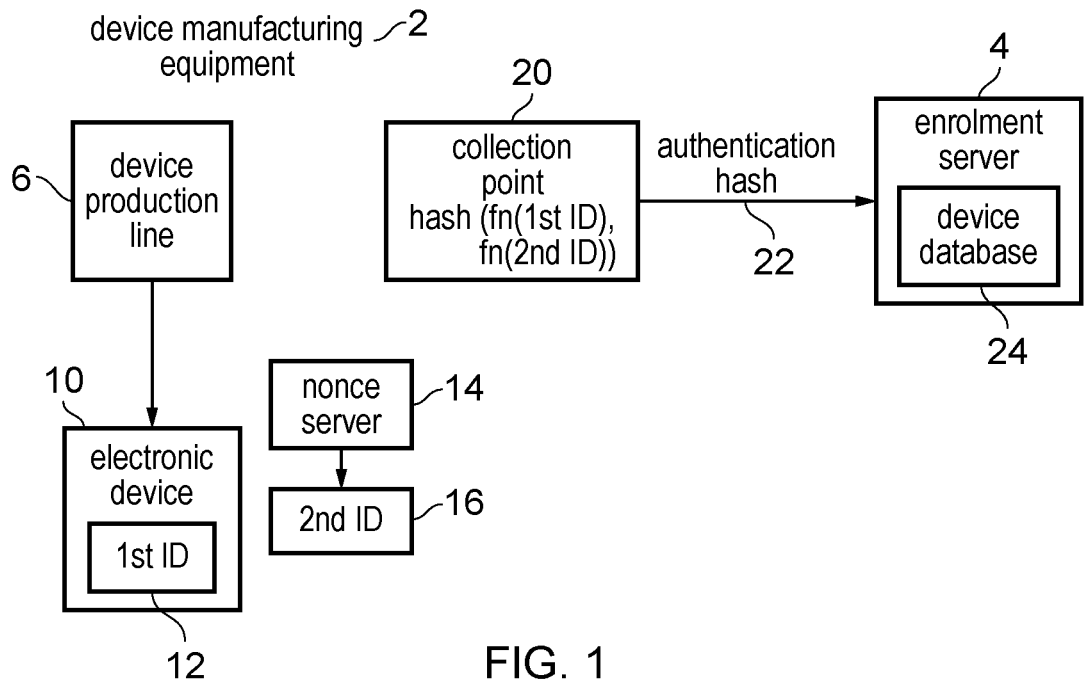

In the technique described below, an electronic device is associated with a first device identifier which is accessible from storage circuitry of the device by a predetermined process executed by the electronic device, and a second device identifier which is inaccessible from the storage circuitry by the predetermined process. A device database is maintained (e.g. by an enrolment server) representing valid pairings of the first device identifier and the second device identifier for a group of known devices. Hence, when it is to be verified whether an electronic device is one of those group of known devices, verification information indicative of the first and second device identifiers may be received and the device database can be looked up based on the verification information (or information derived from the verification information), to determine whether the first and second device identifiers for the electronic device correspond to one of the valid pairings indicated by the database.

By verifying the device based on two different device identifiers accessible through different routes, this provides greater security and hence improved confidence that a device which passes the verification is one of the group of known devices, even in cases when neither the first device identifier nor the second device identifier are secret or generated in a cryptographically secure manner. While authentication based on multiple pieces of identification information may be performed for users of devices, it would be counter-intuitive for verification of whether a hardware device itself is one of a group of known hardware devices, since for device verification it would generally be assumed that a cryptographic key for identifying the device has already been established during manufacture of the device. However, as discussed in more detail below, providing key provision infrastructure during manufacture can be expensive, and the use of the first/second device identifiers discussed above can provide a better balance between security and the cost of manufacturing the device, especially for a class of devices for which the required level of security is such that the full manufacturing overhead of providing cryptographic keys in the device at manufacture may be unjustified. Nevertheless, the separation of a first device identifier which is accessible from storage circuitry of the device by the predetermined process and a second identifier which is inaccessible by the predetermined process can provide protection against a range of possible hacking attacks by which attackers may attempt to compromise a particular device's ability to enrol itself for a given service or to purport that a different device which is not one of the group of known devices is one of the group.

In some examples, it is possible for the device database to explicitly identify pairings of a first value which is a function of the first device identifier and a second value which is a function of the second device identifier, with the first and second values stored in separate fields. However, security can be improved by providing a device database which comprises a database of authentication values, where each authentication value comprises a function of first data dependent on the first device identifier and second data dependent on the second device identifier for one of the group of known devices. More particularly, the function used to derive the authentication value may be a one-way function or cryptographic hash function for which it may be computationally infeasible to determine the values of the first data and second data from the authentication value. By recording the authentication values in the database rather than the actual device identifiers themselves, it is not necessary to communicate the first and second device identifiers between manufacturing equipment for the device and an enrolment server for maintaining the device database, which improves security by reducing the chance that information on the pairing of the first and second device identifiers could be intercepted by an attacker.

In some implementations, the verification information received at the enrolment server may be a target authentication value corresponding to a function of the first data (function of the first device identifier) and the second data (function of the second device identifier). The target authentication value may be received from the electronic device itself or from an enrolment device separate from the electronic device. The target authentication value may be looked up in the device database to check whether the target authentication value matches the authentication values previously recorded in the database.

Alternatively, the verification information transmitted to the enrolment server may comprise separate indications of the first data and the second data, which could be received either from the electronic device or the enrolment device. In this case, the method may comprise generating a target authentication value in dependence on the first and second data and looking the generated target authentication value up in the database.

Hence the computation of the target authentication value for looking up the database could be performed either at the electronic device, or at the enrolment device, or at the enrolment server for maintaining the database. In some cases it may be most secure for the target authentication value to be generated at the enrolment server side, as this means that the hash function for computing the target authentication value from the first data and second data need not be known to the electronic device or the enrolment device which may be in the hands of users within the field.

In some examples at least part of the verification information may be received from an enrolment device which is separate from the electronic device to be verified. This may be useful for a number of reasons. Firstly, for some types of electronic device, the device may be relatively simple and may not have resources for handling some parts of the verification process, and so may delegate some functions to the enrolment device. Also, at the time of verification the electronic device may not be fully operational and may not be yet be able to communicate with an enrolment server maintaining the device database, so the enrolment device may act as an agent for the electronic device. Also, in some implementations, the second device identifier may be made inaccessible to the predetermined process executed by the electronic device by not storing it within the storage of the electronic device at all, but providing it in some external manner, such as encoding it on the casing of the electronic device or on accompanying material such as a device receipt, instruction manual, device label, etc. Hence, in some implementations the enrolment device may be used to read the second device identifier for the electronic device. The enrolment device could be a general purpose processing device, such as a mobile telephone, tablet computer or general purpose computer, e.g. running an app or other software for controlling the enrolment process. The enrolment device could be maintained by the same user who is using the electronic device itself, or could be operated by a service provider. For example, a user may take their electronic device to a service provider in order to enrol their device with that service provider's service, and the enrolment device could be a device operated at the premises of the service provider.

In some cases the method may comprise transmitting a freshness providing value to the electronic device or the enrolment device, and validating the verification information received from the electronic device or the enrolment device to determine whether part of the verification information matches a function of the freshness providing value transmitted to the electronic device or enrolment device. This can provide some protection against replay attacks (in which verification information previously provided by a successfully verified electronic device could be intercepted and reused by a different device to attempt to breach the protection provided by the device database).

At least part of the verification information may be received on a protected communication channel between an enrolment server storing the device database and the electronic device or enrolment device. This can provide added security protecting part of the verification information against interception. The protected channel could also be used for other information being transmitted between the enrolment server and the electronic device or enrolment device, such as a cryptographic key established as part of the enrolment procedure. The protected communication channel could be implemented in different ways. In particular, the protected communication channel may be a cryptographically protected channel (e.g. using encryption or cryptographic signing). For example the electronic device or enrolment device may be required to encrypt part of the data it sends to the enrolment server using a cryptographic key associated with the enrolment server and the enrolment server could decrypt the received data upon receipt and then extract the required verification information and use the decrypted data to look up the device database. Another approach can be for the electronic device or enrolment device to sign part of the verification information and for the enrolment server to validate the signature based on some piece of shared or known verification information associated with the signature. The exact mechanism for protecting the communication channel between the enrolment server and electronic device or enrolment device against possible interception or spoofing of the electronic device can vary from implementation to implementation. Some implementations may trade off reduced security against reduced processing resources and hardware costs, depending on the needs for a particular system.

When the electronic device is determined to be one of the group of known devices, an enrolment action may be performed for the electronic device. The enrolment action could vary significantly from application to application, and could be specific to a given service. In one example, the enrolment action may comprise enabling access to a given service by the electronic device. For example, the electronic device could then be enrolled so that access to some healthcare system or mobile banking system is now permitted. In some cases the access enabling may also be dependent on other verification steps, such as verifying the user of the device, as well as the device hardware itself. Other options for enrolment actions could include acceptance of sensor data recorded by the device by a given service provider (this approach can be useful for Internet of Things type sensors where "access" to the service comprises provision of sensor data used by the service to compute other information, provide information to other devices, or control some hardware system such as a central heating system or lighting system).

In another example, the enrolment action may comprise storing a cryptographic key for cryptographically identifying the electronic device. For example, an electronic device which does not already have a cryptographic key (or asymmetric cryptographic key pair) defined for it at the time of manufacture may generate a key or key pair afterwards when it is already deployed in the field. Such post-manufacture key provision would be extremely unconventional because it would be assumed that it is difficult to verify the identity of the device securely enough to establish that the key or key pair is actually associated with the specific device involved, and that sufficient protection has been established for the generated key material. However, using the verification process discussed above, the first and second device identifiers may be used to improve confidence that the electronic device is one of the known devices and so can be trusted. Hence, upon verification that the device is one of the known devices for which valid pairings of the first and second device identifiers are recorded in the device database, a cryptographic key which is provided by the electronic device may then be stored (in the device database or elsewhere) and this can then be used in future to cryptographically identify the electronic device. The stored key could be a symmetric key for which both the electronic device and the enrolment server have the same key, or could be one of an asymmetric key pair, where the electronic device retains its private key and the public key is transmitted to the enrolment server. In cases where a key is transmitted to the enrolment server, then a protected communication channel may be used as discussed above to protect the integrity and/or confidentiality of the key.

In some cases, the enrolment action for the electronic device may be performed when the electronic device is determined to be one of the group of known devices and the enrolment action has not previously been performed for the electronic device or a predetermined constraint for re-enrolment is satisfied. In some cases a possible avenue for an attack may be to attempt to re-enrol an already enrolled device. This can be avoided by recording in the device database which of the known devices have already had an enrolment action performed for them and preventing enrolment being successful again if the device is already indicated as enrolled and no other predetermined constraint for re-enrolment is satisfied. Some systems may only provide for enrolment once for a given device, and in that case there may be no other re-enrolment constraints considered (other than whether the device has been enrolled before). However some implementations may allow the enrolment action to be performed several times with some constraints. For example, the original owner of a device may be able to relinquish their ownership and perform an un-enrolment process to allow the device to be claimed by a different owner and permit re-enrolment at a later time. The specific conditions required for permitting re-enrolment may be use-case specific and vary significantly from application to application. For example, for some applications the ability to un-enrol a device may be limited to particular parties so that for example the user may have to take their device to a known service provider or manufacturer in order to un-enrol their device and permit a new enrolment action, e.g. by obtaining a code required for un-enrolment.

There are a number of ways of preventing the predetermined process from being able to access the second device identifier from the storage circuitry of the electronic device. In some examples the second device identifier may not be stored in the storage circuitry at all. Instead, the second device identifier could be encoded on a label, tag, casing, or packaging of the electronic device, or on an instruction manual, receipt or other accompanying material associated with the electronic device. In this case, the electronic device itself may not be able to read the second device identifier without the intervention of the user or an external device. For example, the second device identifier could be encoded using a barcode or Quick Response (QR) code, or could simply be printed in the clear (represented as a code using alphanumeric characters) on the outside of the device or on accompanying material. The second device identifier itself need not be secret (e.g. it can be visible to all on the packaging or casing of the device), as it is the pairing of the first identifier with the second device identifier that represents the secret information for representing the device's identity. Therefore, even if an attacker could go into a shop and read the second device identifier from the outside of the device, the device packaging or instruction manual, say, it is unlikely that the attacker would also be able to boot the device and read the first identifier from the storage circuitry within the device without raising suspicion.

Alternatively, the second device identifier could be stored within the storage circuitry of the device itself, but could be stored in a region which is inaccessible to the predetermined process. For example, hardware memory protection mechanisms could be provided to prevent accesses to secure regions of memory being made by non-secure processes running on the device. Hence, the second device identifier could be stored within a secure region of the memory. When executing the predetermined process, access to the second device identifier may require some other piece of code, such as a secure handler function, to read the second device identifier and make it accessible in a way which can allow the pairing of the first and second device identifier to be determined. For example, while the first device identifier may simply be read from memory and output by the predetermined process carrying out the device authentication, the second device identifier could be displayed within a portion of the display of the electronic device which is not accessible by the predetermined process, so that the second identifier can be read from the screen by the user of the device or by the enrolment device. The device identifier could then be input back into the electronic device or transmitted to the enrolment server separate from the first device identifier as part of the verification process. For example, the user could read the identifier from the screen and input the second device identifier, and so a separate enrolment device may not be required.

Where the verification information includes first data dependent on the first device identifier and second data dependent on the second device identifier, the steps of obtaining the first and second data and the step of transmitting verification information indicative of the first and second data can be divided in different ways between the electronic device and the enrolment device. In some embodiments all the steps can be performed within the electronic device itself (e.g. the step of obtaining the second data may correspond to a user inputting the second device identifier). Alternatively all the steps could take place at the enrolment device and the electronic device may carry out relatively little functionality apart from accessing the first device identifier and providing some data dependent on that first device identifier to the enrolment device which can then take responsibility for the rest of the verification process. Alternatively some systems may implement the verification process in a more distributed manner where some steps take place at the electronic device and others at the enrolment device.

An electronic device manufacturing process may include steps of obtaining the first data dependent on the first device identifier, the second data dependent on the second device identifier, and a step of providing authentication information dependent on the first and second data to one of the electronic device and the enrolment server.

In some cases, the manufacturer equipment may transmit the authentication information to the enrolment server to allow the device to be registered in the device database. For example the authentication information may be that the authentication value determined as a function of the first data and the second data, where the function may be a one-way function or cryptographic hash function. In this way, it is not necessary for the enrolment server to ever know the individual first and second device identifiers, which improves security.

Alternatively, the manufacturer equipment may store the authentication information in the storage of the device itself (signed by a manufacturer key that can be validated when the device later presents the authentication information to the enrolment server). Hence, the device itself could act as the communication path between the manufacturer and the enrolment server. As devices not in the known set would not have an authentication value signed by the correct manufacturer key, this can still provide sufficient protection against fraudulent enrolment of devices not made by a valid manufacturer.

In some cases during the manufacture of the electronic device, the first device identifier may be generated and embedded within the electronic device. However, the manufacturing process could be divided into multiple stages, and different stages of the manufacture may be performed by different parties. The part of the manufacturing process which transmits the authentication information to the enrolment server may act on a device which already has the first device identifier embedded in it, so in some cases the first device identifier could simply be read from the storage circuitry of the electronic device during the manufacturing process without needing to freshly generate the first device identifier. However, in other cases the first data could be obtained without booting the electronic device itself. For example, if electronic devices have a known sequence of first device identifiers and are presented to the manufacturing equipment in the order corresponding to their device identifier sequence, then it may be assumed that a particular electronic device encountered at the given point of the sequence will have a particular value of the device identifier, allowing booting of the electronic device to be avoided in some implementations to save time and speed up the manufacturing process.

The second device identifier can be generated during the manufacturing process and may comprise a nonce (random number generated once per device) for example. While this may require a nonce server or other device to provide random numbers with suitable properties for providing the required degree of security (e.g. a sufficient number of bits), this may still be more cost effective than maintaining full key provisioning hosts within the manufacturing site. The manufacturing process may include a step of encoding the second device identifier on a label, tag, casing, packaging or instruction manual for the electronic device, or could include storing the second device identifier into a region of the storage circuitry which is inaccessible to the predetermined process. For example the second device identifier can be stored to a predetermined secure region of memory. Alternatively the second device identifier may be output for encoding on the device or the accompanying material or embedding at a subsequent stage of manufacture, but security can be greater if it is encoded at the time of generating the second device identifier to reduce the transmission of the raw second device identifier between parties.

The authentication information transmitted from the manufacturer site to the enrolment server may be signed with a device manufacturer key. This allows the enrolment server to verify the device manufacturer key at the enrolment side to check that the manufacturer who uploaded the authentication information for a given device can be trusted.

Software may be provided for controlling a data processing apparatus to provide any of the methods discussed above.

This disclosure describes a procedure for enrolment of devices deployed "in the field" with an associated enrolment server that enables the confidential establishment of cryptographic keys between the device and enrolment server. The procedure supports the creation of cryptographic keys (asymmetric key pair, or symmetric key) on a device, where the generation of key material takes place after the device is deployed. It also provides safeguards against fraudulent enrolments, e.g. enrolments of non-existing devices or re-enrolment of devices. Furthermore, it does not require cryptographic keys to be injected into the device at manufacturing time or the use of cryptographic key agreement protocols.

Currently the predominating way to generate a key for a device is in a factory. This is an assumed secure place and keys can more freely be injected or extracted with looser security requirements.

However, as this must take place in a factory, it usually means the addition of extra hardware to the factory lines for managing the key handling (like a hardware security module (HSM), key provisioning host (KPH) or production station). In addition, it implies an increase in manufacturing time as the key pair and associated work around it is added to the manufacturing of each device—which means each item takes longer to produce (which might or might not be acceptable), and also, the collection of all the keys and how they are later to be managed might be infeasible, if say the factory which injects keys is not the one that later will use/attest them.

Also, the overhead in terms of cost to have additional key servers, HSM/KPHs etc. in the factory line might not be reasonable given the device that's being created. That is, if a $1 thermometer is being created, adding expensive HSMs and additional supporting equipment to the manufacturing line might not be economically viable.

Devices which once were created without a key, will never go back to the factory and receive/generate new ones if a new or added security offering for such was needed.

The technique described below reduces the processing stages required in a factory and defines a way to have the key for a given device collected at the time the device is deployed "in the field", and also, the device is enrolled with a server which validates its legitimacy and subsequently acknowledges its existence.

It also allows a venue for post-factory key establishment for devices which were created with no secret key material inserted (or generated) in the factory, meaning the solution could be retrofitted to a pool of existing products where the security of them supported the necessary fundamentals to achieve this scheme (or supports firmware updates where this functionality later could be added), but ultimately could benefit from having a device specific key or key pair at a later time.

For example, the technique may provide:

Confidential establishment of post-manufacturing generated cryptographic keys between the device and enrolment server without the use of cryptographic key agreement protocols.

Method of detecting fraudulent enrolments at the enrolment server, e.g. enrolment of non-existing devices, duplicate enrolments of particular devices or re-enrolment of already enrolled devices.

FIG. 1 illustrates an example of device manufacturing equipment 2 and an enrolment server 4 for generating and storing authentication information for verifying the identity of an electronic device. A device production line 6 within the manufacturing equipment 2 produces the electronic device whose identity is to be verified. The electronic device 10 has embedded within it a first device identifier 12 (called DeviceID in the examples below) which is stored within storage circuitry of the device and is accessible to a predetermined piece of software within the device. For example the predetermined software could be software responsible for controlling an enrolment process for verifying the device identity to an enrolment server. More generally, the first identifier 12 could be stored so that it is accessible to any software within a normal processing domain of the device. In some cases, the device may have hardware protection mechanisms which provide for a trusted execution environment or secure domain. The first identifier can be accessible to an software executing in either the secure domain or the normal domain. As the first device identifier is stored in internal storage of the device, reading the first device identifier may require booting of the device. The embedding of the first identifier 12 in the electronic device 10 could take place within the device production line 6 itself or could have been done at an earlier stage of manufacture.

The manufacturing equipment 2 also includes a nonce server 14 for generating a random number (nonce) which is used as a second device identifier 16 associated with the electronic device 10 (the second device identifier is referred to as DeviceNonce in the examples below). However the second device identifier is not embedded within the storage circuitry of the device in a region accessible to the general purpose software which can access the first identifier 12. Instead, the second identifier 16 is associated with the device in some way that it is inaccessible to the predetermined process which can access the first identifier 12 during the enrolment process. For example the second identifier 16 could be stored within the secure region of memory which is protected by the hardware protection mechanisms from access by software which is not within the trusted execution environment. Alternatively, part of the manufacturing equipment could encode the second identifier 16 in a physical form on the outside of the casing of the electronic device 10, such as using a barcode or QR code. The second identifier could be printed on a sticker to be attached to the device or to a component of the device such as its battery or casing. Also the second identifier 16 could be transmitted to another part of the manufacturing process for transmission to other sites, e.g. for storage in a database accessed when printing device receipts or instruction manuals.

The device manufacturing equipment 2 includes a collection point 20 with a communication path 22 to the enrolment server 4. The communication path 22 may use a protected channel, in which for example encryption and decryption could be used, or messages transmitted over the channel may require signing by a device manufacturer key which can then be validated at the enrolment server 4 to check that the data comes from the trusted manufacturer. The collection point 20 determines an authentication hash value, which is formed by applying a one-way cryptographic hash function to a first data value which is a function of the first identifier 12 and a second data value which is a function of the second identifier 16. The functions of the first and second identifiers may themselves be determined using one-way cryptographic hash functions. The cryptographic hash functions used for the first and second identifiers could be the same or different, and could be the same or different as the hash used to compute the overall authentication hash. The computed authentication hash is transmitted over the protected communication channel 22 to the enrolment server 4. The enrolment server validates that the authentication hash has been received from a trusted manufacturer, and if so then records the authentication hash in a device database 24 which represents valid pairings of the first and second identifiers 12, 16 for a set of known devices. While FIG. 1 shows transmitting a single authentication hash to the enrolment server 4, in practice the collection point 20 may collect several bindings of first and second identifiers and pass corresponding authentication hashes for multiple devices in bulk to the enrolment server 4.

Figure 2:
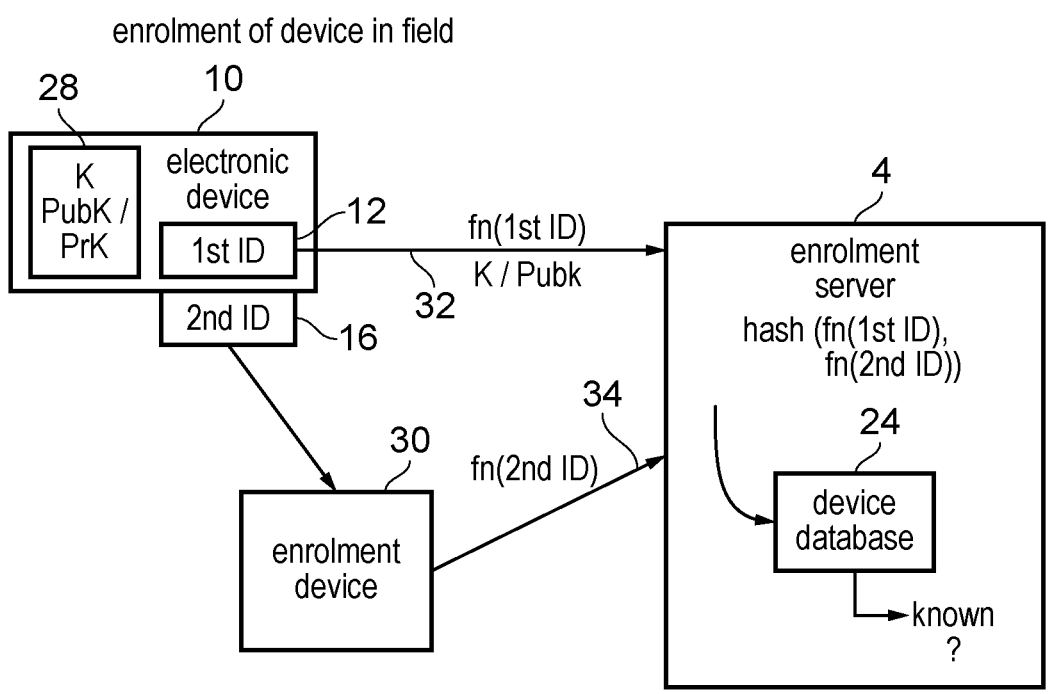

FIG. 2 shows an example of device enrolment once the electronic device 10 is deployed in the field. The device 10 seeks to access some service or provide information to a service, but before access to the service is enabled, it may be verified that the electronic device 10 is one of the known devices manufactured by the trusted manufacturer. The device 10 still has embedded in the device storage its first device identifier 12, as well as being associated with the second device identifier 16 which is inaccessible to a predetermined process from the device storage. Part of the enrolment process may involve the device 10 generating key material 28 for verifying the identity of the electronic device 10. For example the key material 28 may include a symmetric cryptographic key K which can be shared between the electronic device 10 and the enrolment server 4. Alternatively the key material 28 could comprise an asymmetric key pair PubK, PrK generated by the device 10, of which a public key PubK can be shared with the enrolment server and a private key PrK retained by the electronic device 10, so that the device can prove its identity without ever revealing the secret private key to any other device. The generated key material 28 can be used for encryption or decryption of messages or for signing of messages. In order for the enrolment server to gain confidence that the enrolment is performed by an entity with access to a device in the known set of devices, it may look up authentication information for the device in the device database 24 to check it against the known set of devices for which authentication information has been registered. In this example an enrolment device 30, which is separate from the electronic device 10 itself, is provided to act as an agent between the electronic device 10 and the enrolment server 4. For example the enrolment device 30 can be used to read the second identifier 16 from the casing of the electronic device or accompanying material. In some cases, all communications from the electronic device 10 to the enrolment server 4 could also pass via the enrolment device 30, although in this particular example the electronic device 10 is also shown as being able to transmit data to the enrolment server 4.

Hence, during the enrolment process a first data value 32 which is a function of the first identifier 12 is transmitted to the enrolment server 4 by the electronic device 10 in this case (although it could also come from the enrolment device 30). Also a second data value 34 which is a function of the second device identifier 16 read by the enrolment device 30 is transmitted from the enrolment device 30 to the enrolment server 4. The first and second data values 32, 34 are an example of verification information. The enrolment server computes the authentication hash value from the first and second data values using the corresponding function used by the collection point 20 at the manufacturing stage, and looks up the resulting hash in the device database 24. If the hash is present in the database then it can be determined that the electronic device 10 is one of the known set of devices. The electronic device 10 may also transmit its symmetric key K or public key PubK to the enrolment server 4 (if the key is a symmetric key K, the key K would not be transmitted in the clear), and if the device is verified as a known device the key can be stored and then the key can be used on future occasions to check the identity of the specific device.

Hence, this approach provides for key provision post manufacture which avoids the need for manufacturing equipment to have complicated key generating equipment. A service provider can learn that a device now trying to enrol is one that came from an original manufacturing line. Although the security provided may not be as high as if cryptographically secure keys were injected during manufacturing, this can still be enough for many applications. For example, a service provider running a cloud service for Internet of Things connected devices may simply need to ensure that a party attempting to access its service has access to one of a limited set of devices known to have particular properties, but the device may be cheap enough that it is not worth investing in a full manufacturing line with key provisioning capability. For example, an Internet of Things actuator within a refrigerator or central heating system may not be associated with transactions which are high enough value to justify more secure key provisioning equipment. With this approach, the pair of identifiers 12, 16 which are accessible via different methods provides sufficient confidence that keys can be provided to the device after manufacture, or enrolment decisions made with a level of trust that the device 10 is a known device, without requiring expensive manufacturing equipment.

FIG. 1 shows an example where the authentication hash 22 (signed by the manufacturer) is uploaded to the enrolment server 4 during the manufacturing process. As an alternative, it would be possible to store the signed authentication hash 22 in the storage of the electronic device 10 itself. This would remove the need for the collection point 20 to have a connection to the enrolment server 4, although it would require the device 10 to be booted during the manufacturing process in order to write the authentication value to the device storage. The device 10 itself can act as the means of conveying the authentication value to the enrolment server 4. With this approach, the signed authentication value can be presented to the enrolment server 4 the first time the device 10 takes part in an enrolment process (before the actual enrolment takes place). At the time of the first enrolment, the enrolment server 4 may validate the manufacturer's signature in the same way as discussed above, and record the authentication value in the database 24 if the manufacturer's signature is valid (this prevents a device being able to circumvent the database by uploading a spurious authentication value generated independently of the manufacturer). Note that in some cases the device database may register devices from multiple manufacturers, so the authentication value can be validated if it is signed by the manufacturer key of any of the trusted manufacturers. If the signature is validated and the authentication value recorded in the database, the device can then proceed with enrolment in the same way as discussed above based on the first and second identifiers. For subsequent attempts at enrolment (e.g. when enrolling with a different service provider), there may be no need to present the signed authentication value again, as the authentication value would already be recorded in the database.

Figure 3:
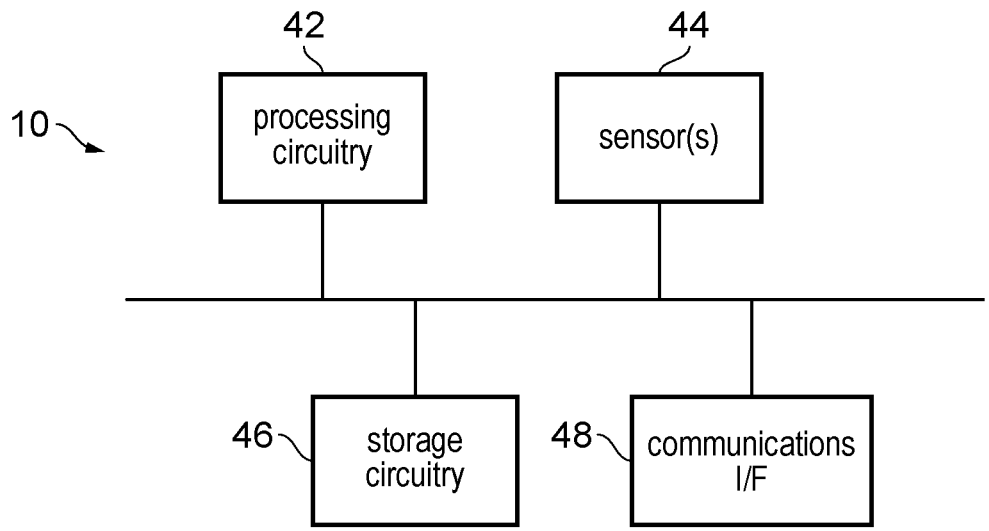

FIG. 3 shows an example of hardware components of the electronic device 10. As shown in FIG. 3 the device 10 may include processing circuitry 42 (e.g. a microcontroller or central processing unit). In some cases there may be multiple processor cores within the same device. The device may also include one or more sensors 44 for sensing various external conditions, such as temperature, infrared radiation, images captured using a camera, etc. The purpose of the specific sensors 44 may be dependent on the particular application for the device. The device also comprises storage circuitry 46 (e.g. a memory) for storing data to be processed by the processing circuitry 42 or software to be executed by the processing circuitry 42. While the diagram shows a single unit of storage circuitry 46, it is possible that there may be multiple different types of storage devices or different storage units of the same type. Communication interface circuitry 48 is also provided for communication between the device and external devices such as the enrolment server 4 and the enrolment device 30. The communication interface could use wireless communication or wired communication and could use a range of protocols such as Bluetooth® Wi-Fi®, ZigBee® etc. It will be appreciated that FIG. 3 is just one example, and other components or configurations of the device 10 could also be provided. For example some forms of the device 10 could have a display unit for displaying information to a user, although this may not be essential for all electronic devices 10 as some devices could simply provide sensing capability and transmit the sensor data to an external device but may not have any user interface components. Similarly, a user input/output interface may not be essential but could be provided.

Figure 4:
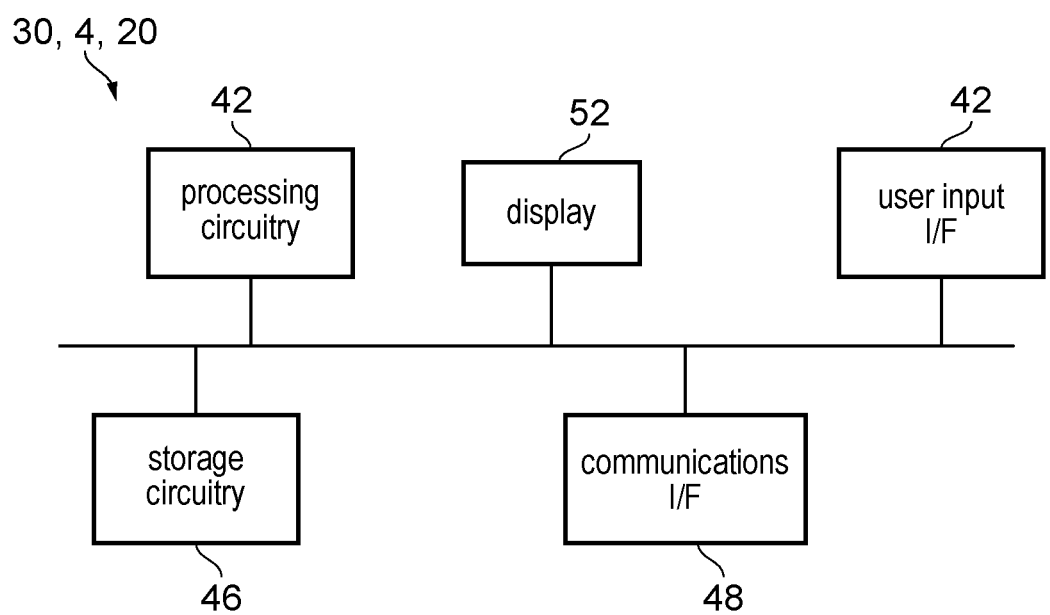

FIG. 4 shows an example of components of the enrolment device 30, enrolment server, or collection point 20 in the manufacturing equipment 2. In this example as well as having processing circuitry 42, storage circuitry 46 and a communication interface 48 as in FIG. 3, a display 52 for displaying information to a user and a user input interface 54 for receiving user input are also provided. It will be appreciated that the storage circuitry 46 in the enrolment server 4 may have much greater capacity than the storage circuitry 46 in the electronic device 10. Again, many other components could be provided within the devices 30, 4, 20 and FIGS. 3 and 4 are just an example. The display 52 may be optional— e.g. in some cases the enrolment device 30 or collection point 20 could mirror a screen to an off-device display, or use a printer, etc.

Figure 5:
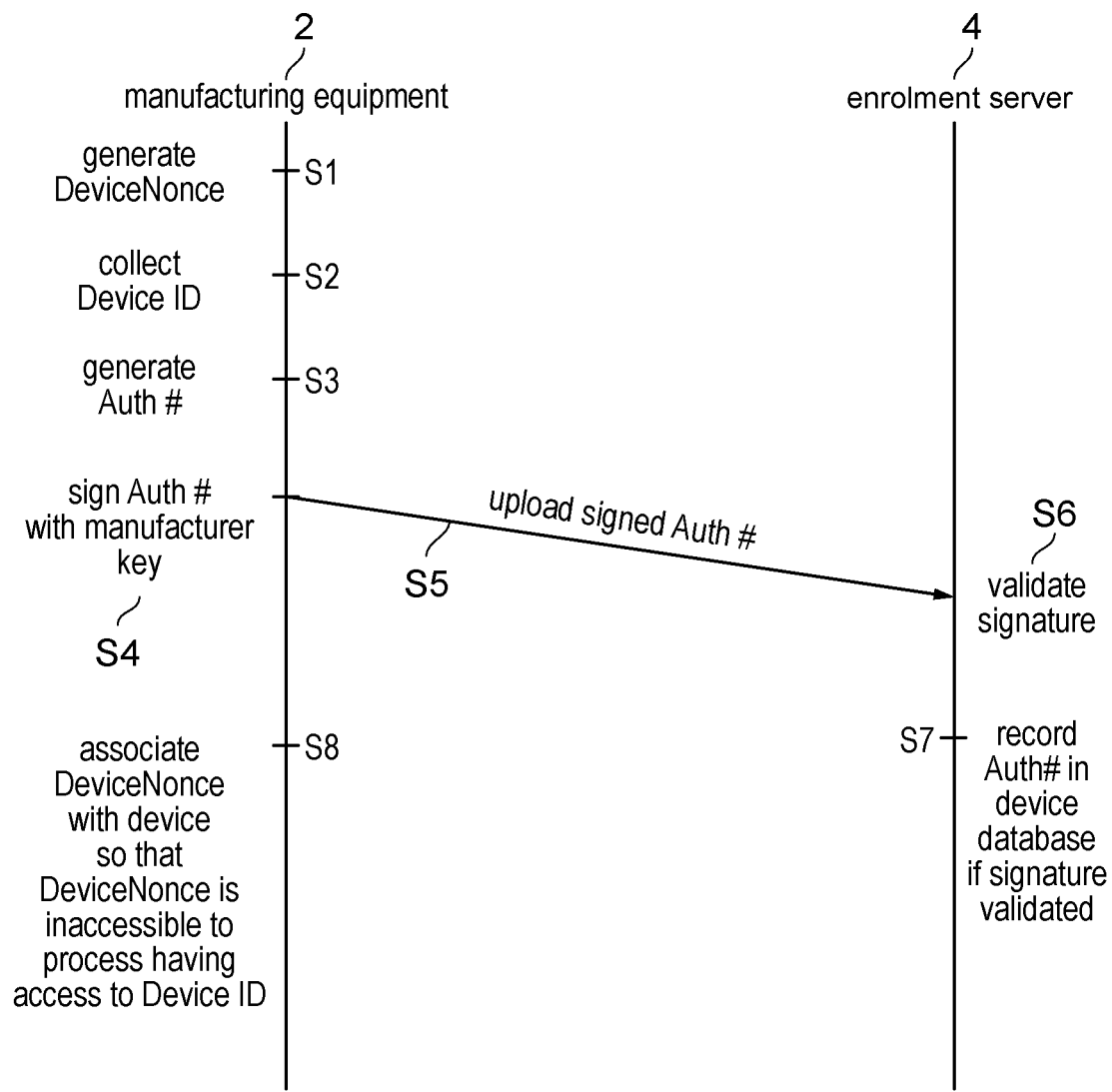
FIG. 5 shows a method of generating authentication information for an electronic device during a manufacturing process.
Figure 6:
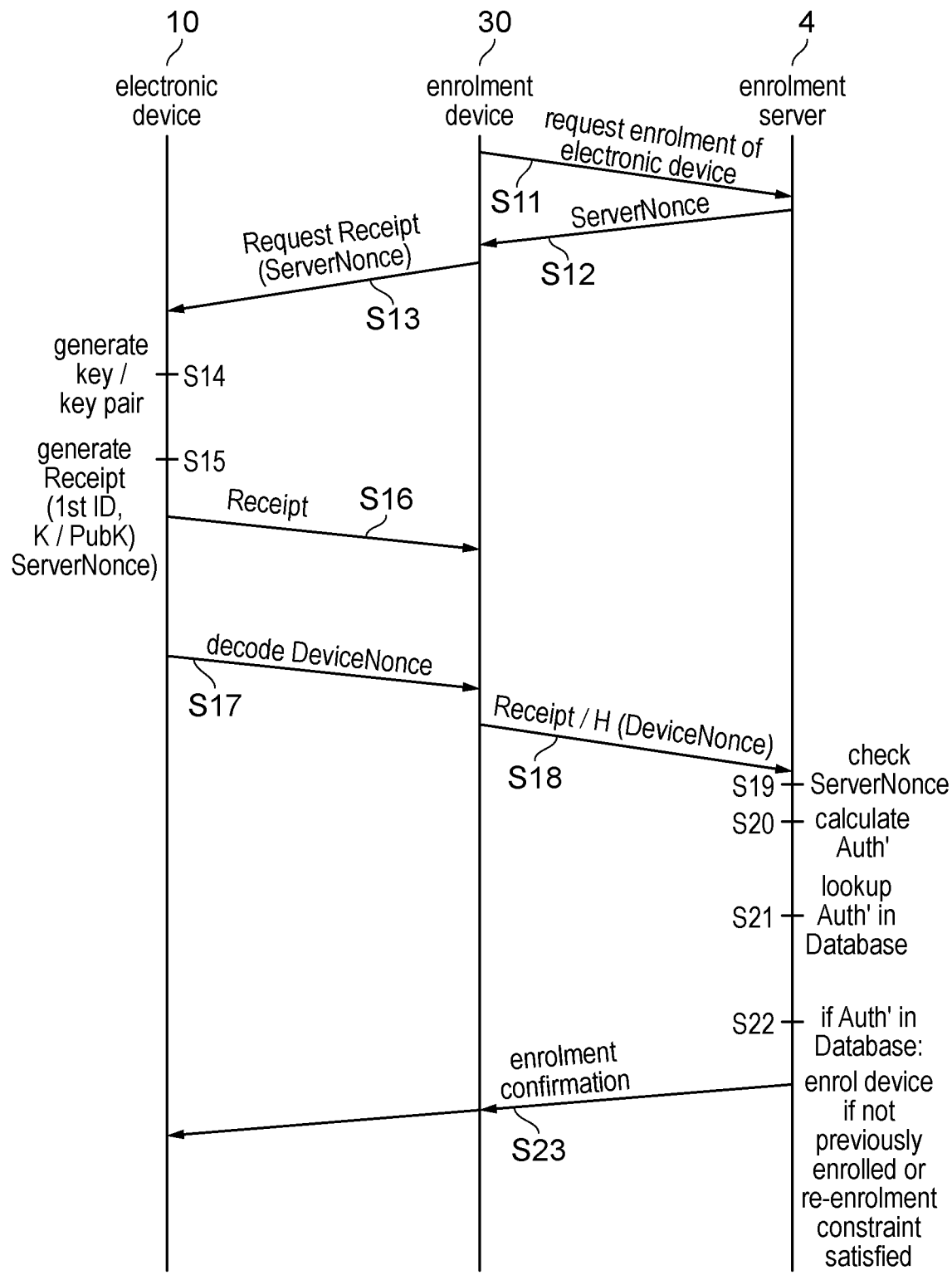
FIG. 6 shows a method of determining whether an electronic device is one of a known group of devices using the authentication information.

FIGS. 5 and 6 show a more detailed example of a manufacturing process and enrolment process. In these examples, the target device is assumed to have a device Identity, DeviceId (first device identifier). The DeviceId is not confidential but is assumed to have the following properties:
a) It uniquely identifies the device it is associated with.
b) It is not secret, i.e. can be queried from the normal world of the device
c) Is immutable
d) Can be predictable, i.e. a subsequent device in a series could have a similar identity to the preceding one, except for e.g. the last digit. Say, device1: 123-456-781, and device2: 123-456-782, i.e. last digit is the only difference between them both.

FIG. 5 shows part of an electronic device manufacturing process. During manufacturing, the manufacturing process incorporates a nonce server 14 or equivalent component. This nonce server produces a random number, of sufficient size, for each device, referred to as the DeviceNonce (second device identifier). The DeviceNonce is independent of the DeviceId, i.e. by gaining knowledge of the value DeviceId, it is not possible to determine the generated random DeviceNonce or by gaining knowledge of the DeviceNonce it is not possible to determine the DeviceId. The value of the DeviceNonce is not confidential but information about which DeviceNonce is associated with which device (and in extension the device's DeviceId) constitutes is sensitive information which remains confidential. More on this later.

When a device is to be manufactured, at step S2 the DeviceId for each device is collected, and a DeviceNonce for it is generated (step S1). At step S3, the (DeviceId, DeviceNonce)—pair for each device is then processed using a one-way cryptographic hash function H to obtain Auth=H (H (DeviceId)||H(DeviceNonce)). In this example, the same hash function H is used three times for generating the authentication value (once for hashing the DeviceId, once for hashing the DeviceNonce, and once for hashing the combination of the hashes of the DeviceId and DeviceNonce). However, other examples could use different hash functions for different parts of the calculation (e.g. more generally Auth=$H_1$ ($H_2$ (DeviceId)||$H_3$ (DeviceNonce)). Also, it will be appreciated that this is just one way in which an authentication value can be generated using at least one one-way hash function in dependence on the DeviceId and DeviceNonce—in general any function can be used which generates an authentication value based on DeviceId and DeviceNonce where the function used makes it computationally infeasible to derive DeviceId and DeviceNonce from the Auth value.

A collection point on the manufacturing line collects the Auth values for each manufactured device. At step S5 the aggregate list of Auth values is uploaded to the enrolment server. In order to ensure the integrity of the received combined Auth values, they are signed at the manufacturing site (step S4) and validated by the enrolment server (step S6) before accepting enrolment of the corresponding devices. The enrolment server stores validated Auth values in its device database (step S7).

Note: the enrolment server never received (nor saw) the raw DeviceId nor the DeviceNonce. The device itself will not receive a device-specific key nor generate one during its time in the factory. Instead, the public key of the enrolment server responsible for the device's later enrolment is embedded in its pre-flashed software image. The device does not need to be booted during manufacturing if the DeviceId is otherwise known.

Later on, during the manufacturing of the device, at step S8 the DeviceNonce previously generated and associated with the device, is encoded into a suitable form, e.g. a Quick Response Code, barcode or alphanumeric code that may be attached to the final product in some way, c.f. how IMEIs are printed on stickers for mobile phones.

At a later point in time, the device is started in the hands of its end-user or otherwise deployed in the field. FIG. 6 shows the enrolment process. The device will at this point in time generate a device specific cryptographic key. Device enrolment with the enrolment server may be aided by an enrolment device that acts as a proxy between the device being deployed and the enrolment server.

The motivation behind the enrolment device is that the device being deployed is presumed to lack an Internet configuration at this point in time, as well as having limited capabilities to interact with the user or technician performing the deployment. The enrolment device may update the software on the device 10 (possible providing the device with the public key of the enrolment server 4 and provide means of the user to personalize and configure the device 10 being deployed. e.g. provide it network credentials to allow it to connect to the Internet. This may require successful completion of the enrolment procedure, however, the specifics of such policies employed by the devices in question are not inherent to the idea.

The enrolment device initiates the enrolment request (step S11) by contacting the enrolment server responsible for the deployed device. In scenarios that require the enrolment server to ensure the freshness of a response received from the device, the server may generate a random ServerNonce in response to the enrolment request initiated by the enrolment device.

As an optional step S12, a nonce from the server 4 is fed down to the device 10 before the key generation takes place, but it is not strictly necessary (because the nonce is envisioned to be used to deter replay attacks on previous enrolments, but a device is generally only enrolled once, thus the nonce in such a case would not be required).

At step S13, the enrolment device 30 contacts the device 10 and requests for its Receipt (including the ServerNonce if one is used in the request to the device).

The device 10 responds by:
1. At step S14 generating its key or key pair (of sufficient strength according to chosen algorithm),
2. At step S15, generating the Receipt by:
   a. Calculating a hash over the DeviceId using H, i.e. H(DeviceId).
   b. Encrypting the device specific key $K_{Device}$ (or public key $PubK_{Device}$ in case of asymmetric key pair) and H(DeviceId) using the encryption function Enc with the enrolment server's public key $PubK_{EnrolmentServer}$, using a suitable algorithm that provides confidentiality and integrity of the payload (such as ECIES, or RSA with OAEP):
3. At step S16, the device 10 transfers the obtained Receipt=Enc($PubK_{Device}$∥H(DeviceId), $PubK_{EnrolmentServer}$) to the enrolment device 30. If a ServerNonce is used, it is included in the Receipt which takes the form Receipt=Enc($K_{Device}$∥H(DeviceId) ∥ServerNonce, $PubK_{EnrolmentServer}$)
(the notation ∥ refers to concatenation).

The enrolment device 30 has one additional purpose besides acting as a proxy between the deployed device and enrolment server; at step S17 it decodes the encoded DeviceNonce provided with the device e.g. from a QR Code attached to the final product (or similar). At step 18 the enrolment device 30 then sends the device (Receipt, H(DeviceNonce)—pair to the enrolment server 4:

The enrolment server 4 does the following operations:
1. Extracts H(DeviceNonce) from the data received from the enrolment device.
2. Using the decryption function Dec its private key $PrivK_{EnrolmentServer}$ it extracts the H(DeviceId), $K_{Device}$ (and ServerNonce if included) from the received Receipt by performing: Dec(Receipt, $PrivK_{EnrolmentServer}$).
3. At step S19, the server checks whether the extracted ServerNonce matches the ServerNonce transmitted at step S12, and if there is a mismatch, halts the enrolment process.
4. At step S20, the server 4 calculates Auth'=H (H(DeviceId)∥H(DeviceNonce))
5. At step S21, the server 4 compares Auth' to the known good Auth values stored in its device database.
   a. If the Auth' cannot be found in device database, the device enrolment is rejected.
   b. If Auth' was found, but the corresponding device is marked as enrolled the device enrolment is rejected.
   c. If Auth' was found, and the device has not been marked as enrolled, the key $K_{Device}$ is stored by the enrolment server, the device corresponding to Auth' is marked as enrolled and device enrolment is completed (step S22).
6. Optionally at step S23 a confirmation message can be returned to the device 10 (via the enrolment device 30) confirming the correct decoding of the device's public key. Only once this has been successfully received by the device 10, will it assume the enrolment succeeded. If it does not receive this message, it will still have created its $K_{Device}$, but will need to at a later time, embed this into a new receipt as above and attempt to re-enrol with the server 4 until completion.
7. Optionally said confirmation message might likewise be encrypted similarly with the device's key $K_{Device}$ as proof that the server 4 actually received the correct key and that it could decrypt it correctly. The confirmation message is passed back to the device 10 for validation. The outcome of that operation is then returned to the enrolment device 30 and displayed to the user (i.e. "SUCCESS or "FAILURE"). For increasing confidence that the confirmation originates from the server, another nonce ConfirmNonce can be included in the receipt sent to the server 4, encrypted with the server's public key. The server could decrypt ConfirmNonce, encrypt it with $K_{Device}$ and sign it with $PrivK_{EnrolmentServer}$, and send the signed value to the device as the confirmation message. The device can then verify the signature and decrypt the nonce, and check that the decrypted nonce matched ConfirmNonce sent as the challenge.

Note: The main purpose of ServerNonce is to ensure freshness, as replay attacks against the enrolment procedure can be detected by the means of a repeated (H (DeviceId), H(DeviceNonce))—pair used in enrolment. If the ServerNonce is omitted, the Receipt only needs to be calculated once by the deployed device.

After this step, the enrolment server and the device have established a key relationship and can from that point in time initiate a more secure channel of communication.

Some threat models against this design and the corresponding countermeasures are discussed below.

In general, some classes of threats that can be addressed are the following:
1. An attacker fraudulently wants to enrol a specific device 10 (i.e. one the attacker is not a legitimate owner of).
2. An attacker fraudulently wants to enrol a non-existing device 10.
3. An attacker fraudulently tries to re-enrol a device 10 it is not a legitimate owner of.
4. Man-In-The-Middle (MITM) between the enrolment device 30 and the enrolment server 4
5. MITM between the enrolment device 30 and the deployed device 10 itself (i.e. the device 10 that we wish to enrol)

Under a passive attacker model where the attacker has access to either the DeviceId (Scenario 1.) or DeviceNonce (Scenario 2.), but not both, the attacker is reduced to performing a brute force attack against a particular DeviceNonce, when the DeviceId is fixed (Scenario 1.) or any legitimate (DeviceId, DeviceNonce)—pair. Assuming hash function H has good properties, and that both DeviceId, DeviceNonce have sufficient length, this venue of attack can be made computationally infeasible.

Under an active attacker model where the attacker has access to either the DeviceId (Scenario 1.) or DeviceNonce (Scenario 2.), but not both, the attacker can attempt to mount MITM against the participants in the protocol. In an active attack, the objective of the attacker is to tamper with the Receipt in a way that allows the attacker to substitute the device specific key $K_{Device}$ to an attacker controlled key $K_{Attacker}$ which allows the attacker to compromise subsequent communication between the deployed device and server. Since the Receipt is encrypted and integrity protected using the enrolments servers public key $PubK_{EnrolmentServer}$ the attacker cannot tamper or eavesdrop the $K_{Device}$ or H (DeviceId). However, if the attacker can predict the DeviceId, he can replace Receipt with Receipt'=Enc($K_{Attacker}$||H (DeviceId)||ServerNonce, $PubK_{EnrolmentServer}$). This attack may be trivially addressed by establishing a secure channel, such as a TLS connection between the device 10 or enrolment device 30 and the enrolment server 4.

Tampering with the DeviceNonce may case Denial of Service (DOS) conditions as a modified DeviceNonce' would result in the following behaviour at the enrolment server 4:
1. As the server 4 uses H(DeviceNonce) to compute Auth'=H (H (DeviceId)||H(DeviceNonce)), the server 4 would not find the matching device that this key was claimed to be for and thus reject the message. This is in essence a denial of service attack, not a security threat.
2. The modified H(DeviceNonce) in combination with H (DeviceId) creates a Auth'=H (H (DeviceId)||H(DeviceNonce)) of another legitimate device. This is a potential risk, but also highly improbable if the hash function H has good properties.

If the device 10 is compromised, the attacker cannot maliciously enrol the device 10, because it lacks access to the DeviceNonce as described above (remember, these are not readable in the device 10 itself, and are instead added to the outside of it, on a sticker or similar). Thus, indeed the attacker could generate or otherwise eavesdrop on the key for the device (or even replace it), but not much more. True, if the key did leak, this is an attack on the security of the underlying device 10 itself, but not the actual key generation use-case explained herein.

Even if the attacker casually walked into a retailer and scanned QR Codes containing DeviceNonces from devices 10, by lacking access to the corresponding DeviceId, the attacker could not enrol these devices 10 (or "claim" them), unless a second physical attack on the devices 10 themselves (to extract the Deviceid) was undertaken.

Maliciously enrolling devices 10 is not possible, because even if the attacker could "guess" DeviceIds, the attacker could not guess the corresponding DeviceNonce, and thus would fail to enrol these devices 10.

This exact logic applies to why maliciously re-enrolling devices 10 would fail too—unless the Nonce/QR Code was known, the attacker could not try and re-claim someone else's device. However, as also stated above, if the device 10 already was enrolled, the attacker providing a correct DeviceNone and DeviceId will still fail to claim ownership of the device, as the enrolment server 4 would reject the subsequent enrolment attempt.

Figure 7:
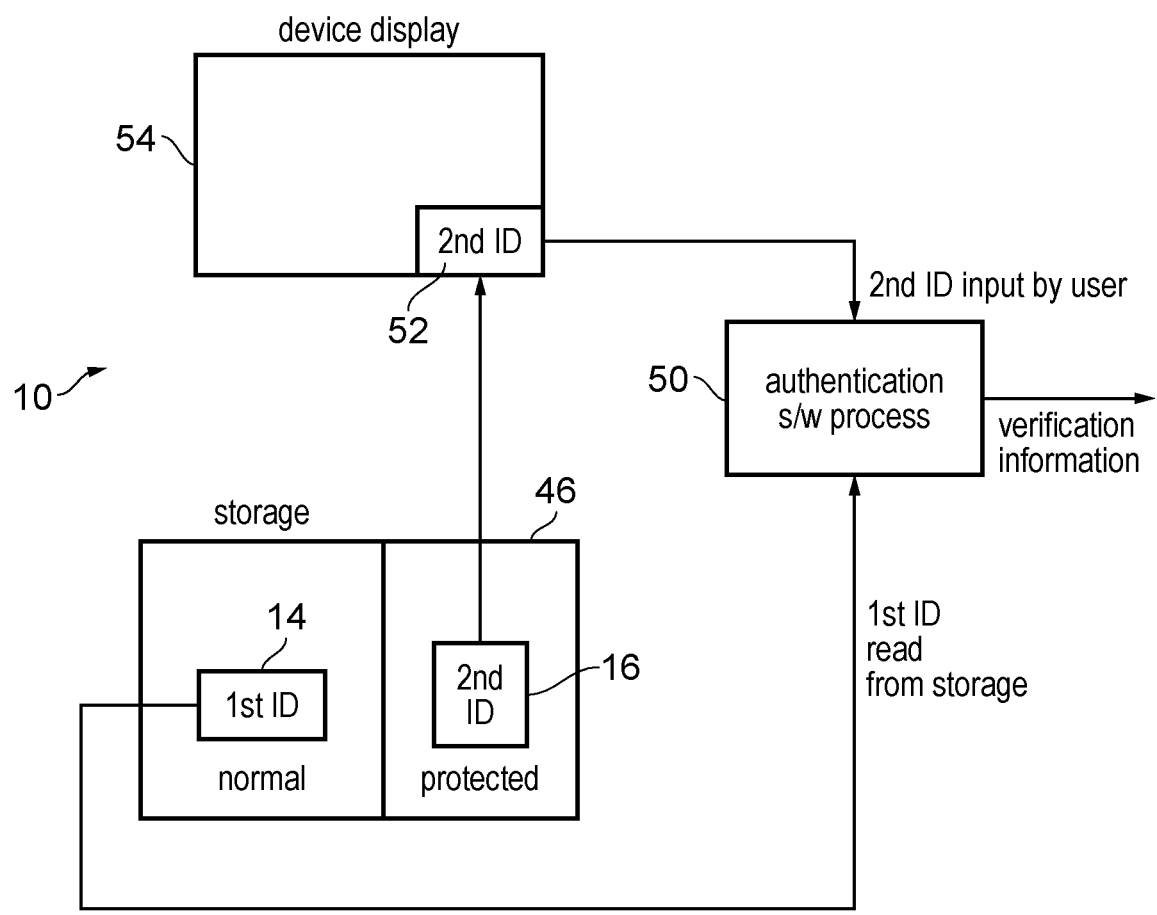
FIG. 7 shows another example of preventing a second device identifier being accessible to a software process which has access to a first device identifier.

In the examples discussed above a separate enrolment device 30 is used as an agent between the electronic device 10 and the enrolment server 4, but this is not essential. In other examples the functions of the enrolment device 30 could be performed by the electronic device instead. In this case rather than reading the second identifier 16 from a casing of the electronic device 10 the second identifier could be obtained by the user inputting the second identifier after reading the identifier from the casing or other material associated with the device. Alternatively, as shown in FIG. 7 the second device identifier 16 could be stored in a protected region of the storage circuitry 46 which is protected from access by processes running in a standard execution environment (normal world) of the device 10 by hardware protection mechanisms maintaining a trusted execution environment (secure world). For example, an example of a technique for maintaining a trusted execution environment can be the TrustZone® technology provided by ARM® Limited of Cambridge, UK, but it will be appreciated that other technologies could also be used to enforce separation between more secure processes running in the protected execution environment and less secure processes running in the normal domain.

Hence, during the process for authenticating the device 10 to the enrolment server 4, the software 50 running the authentication process may be able to read the first identifier 14 directly from the storage 46 of the electronic device 10 but cannot read the second identifier 16 from the protected region. A secure process running in the trusted execution environment may control displaying the second identifier 16 on a region 52 of the device display 54 which is not controllable from the authentication process 50 running in the normal world. Techniques for partitioning part of the display from the intervention of a given process are known in the art. While FIG. 7 shows an example where the region 52 is just part of the display screen, in other cases the region 52 could be the entire display screen. Also, in some cases the second identifier could be hardcoded into the display screen itself, without requiring any software input. Hence, the second identifier 16 can then be read from the display 54 by the user and input through the user input interface of the device in order to provide the identifier to the authentication process 50 which may then use that to transmit the required verification information to the enrolment server. Hence, this provides an approach for verifying that the device 10 is one of the known set if devices without needing a separate enrolment device 30. In some cases this may improve security to some extent because it is not possible to enter a shop or other location and read the second identifier 16 from the outside of the device. However, it may require the electronic device 10 to have greater hardware security resources for protecting the second identifier 16 against the regular access from the authentication process 50, and also it may add cost to implementing the display 54, and so which of the approaches discussed above is selected may be a trade-off between security and cost of implementation.

It is also possible to provide means to provide the second identifier programmatically directly from a trusted execution environment to the authentication process based on some action performed by the user, so that there is no need to display the second identifier on the screen. The authentication process still cannot access the second identifier from the storage circuitry of its own volition—some external intervention from a trusted execution environment or the user may be required to give the authentication process access to the second identifier.

The examples given above use encryption to protect the key material 28 from the electronic device 10 and first identifier 12 from interception during transmission to the enrolment server 4. However, this is not essential and there are other ways of implementing a protected communication channel between the enrolment server 4 and one or both of the electronic device 10 and the enrolment device 30.

For example, instead of using encryption, the device 10 could pass back to the server 4 a signed statement of the device's generated key 28 along with the hash(deviceID). The signature could be verified by the enrolment device 30. For example, The device 10 can generate a symmetric key, uses this symmetric key to sign the enrolment message (e.g. HMAC-SHA256, AES or another one-way hash function. The device 10 passes this signed blob+an encryption of said symmetric key (by using the enrolment server's public key), and this is then all passed to the server. For example:
IoT device 10:
sym=random(32);
s=sign(PubK$_{Device}$∥H (DeviceID), sym);
enc=Enc(sym, PubK$_{EnrolmentServer}$);
send(s, enc);
server 4:
receive(s, enc);
sym=Dec(enc, PubK$_{EnrolmentServer}$);
s'=verify(s, sym);
s !=s'?

Another option could be that the first and second identifiers could be used as parts of a key system where they can be used to establish a secure connection to the server. For example, a system can be used where the server 4 passes a nonce to the device 10, and this is used in a KDF (Key Derivation Function) where parts of the first/second device identifiers are included, along with another nonce from the device, which is passed back to the server which then does the same KDF to generate the same key. Using that key we could then protect the device's generated key-pair for later parts of the enrolment process.

Hence, there are a range of options available for providing a protected channel for transmission of key material between the device 10 and server 4 during the enrolment process, which may trade off security and against hardware or software processing overhead.

The following clauses define further examples:
(1) A method for establishment of post-manufacturing-generated cryptographic keys between an electronic device and an enrolment server.
(2) The method according to clause (1), wherein the method is performed without the use of cryptographic key agreement protocols.
(3) The method according to any preceding clause, wherein the electronic device generates a cryptographic key, generates identity proving information based on secret information held by the electronic device, and transmits the cryptographic key and the identity proving information to the enrolment server; and the enrolment server validates the cryptographic key based on the identity proving information and electronic device authentication information transmitted to the enrolment server during a manufacturing process for manufacturing the electronic device.
(4) The method according to any preceding clause, wherein the electronic device is associated with a first device identifier and a second device identifier.
(5) The method according to clause (4), wherein the first device identifier is readable by a processing circuit of the electronic device.
(6) The method according to any of clauses (4) and (5), wherein the second device identifier is unreadable by a processing circuit of the electronic device.
(7) The method according to clause (6), wherein the second device identifier is encoded on a casing of the electronic device.
(8) The method according to any of clauses (6) to (8), wherein the second device identifier is read by an enrolment agent device separate from the electronic device and transmitted to the enrolment server by the enrolment agent device.
(9) The method according to any of clauses (4) to (7), wherein the enrolment server stores correlation information correlating the first device identifier and the second device identifier.
(10) The method according to clause (9), wherein the enrolment server validates a cryptographic key generated by the electronic device in dependence on the correlation information, information generated by the electronic device using the first device identifier, and the second device identifier.
(11) A method for verifying whether an electronic device is one of a group of known devices, comprising:
receiving verification information indicative of a first device identifier accessible from storage circuitry by a predetermined process executed by the electronic device and a second device identifier inaccessible from said storage circuitry by said predetermined process; and
looking up a device database representing valid pairings of said first device identifier and said second device identifier for said group of known devices, to determine whether the first device identifier and the second device identifier for the electronic device correspond to one of said valid pairings.
(12) A method for verifying whether an electronic device is one of a group of known devices for which a manufacturer or factory by which the device was made, a hardware configuration of the device, or a mechanism provided on the device at a platform level meets a predetermined property, comprising:
receiving verification information indicative of a first device identifier accessible from storage circuitry by a predetermined process executed by the electronic device and a second device identifier inaccessible from said storage circuitry by said predetermined process; and
looking up a device database representing valid pairings of said first device identifier and said second device identifier for said group of known devices for which the manufacturer or factory, hardware configuration or mechanism provided at the platform level meets the predetermined property, to determine whether the first device identifier and the second device identifier for the electronic device correspond to one of said valid pairings.

(13) The method of any of clauses (11) and (12), wherein the device database comprises a database of authentication values, each authentication value comprising a function of first data dependent on the first device identifier and second data dependent on the second device identifier for one of said group of known devices.

(14) The method of clause (13), wherein the function is a one-way hash function.

(15) The method of any of clauses (13) and (14), wherein the verification information comprises a target authentication value received from the electronic device or an enrolment device separate from the electronic device, and the method comprises looking up the target authentication value in the device database.

(16) The method of any of clauses (13) and (14), wherein the verification information comprises separate indications of the first data and the second data received from the electronic device or an enrolment device separate from the electronic device, and the method comprises generating a target authentication value in dependence on the first data and the second data, and looking up the target authentication value in the device database.

(17) The method of any of clauses (11) to (16), wherein at least part of the verification information is received from an enrolment device separate from the electronic device.

(18) The method of any of clauses (11) to (17), comprising transmitting a freshness providing value to the electronic device or an enrolment device separate from the electronic device, and validating the verification information received from the electronic device or the enrolment device to determine whether part of the verification information matches a function of the freshness providing value transmitted to the electronic device or the enrolment device.

(19) The method of any of clauses (11) to (18), wherein at least part of the verification information is received on a protected communication channel between an enrolment server storing the device database and the electronic device or an enrolment device separate from the electronic device.

(20) The method of any of clauses (11) to (19), comprising performing an enrolment action for the electronic device, when the electronic device is determined to be one of said group of known devices.

(21) The method of any of clauses (11) to (19), comprising performing an enrolment action for the electronic device when the electronic device is determined to be one of said group of known devices and the enrolment action has not previously been performed for the electronic device or a predetermined constraint for re-enrolment is satisfied.

(22) The method of clause (21), wherein the enrolment action comprises enabling access to a predetermined service by the electronic device.

(23) The method of clause (21), wherein the enrolment action comprises storing a cryptographic key received from the electronic device for cryptographically identifying the electronic device.

(24) An enrolment server, comprising:
communication circuitry to receive verification information indicative of a first device identifier accessible from storage circuitry by a predetermined process executed by an electronic device and a second device identifier inaccessible from said storage circuitry by said predetermined process;
storage circuitry to store a device database representing valid pairings of said first device identifier and said second device identifier for a group of known devices; and
processing circuitry to lookup the device database to determine whether the first device identifier and the second device identifier for the electronic device correspond to one of said valid pairings.

(25) An enrolment server, comprising:
communication circuitry to receive verification information indicative of a first device identifier accessible from storage circuitry by a predetermined process executed by an electronic device and a second device identifier inaccessible from said storage circuitry by said predetermined process;
storage circuitry to store a device database representing valid pairings of said first device identifier and said second device identifier for a group of known devices for which a manufacturer or factory by which the device was made, a hardware configuration of the device, or a mechanism provided on the device at a platform level meets a predetermined property; and
processing circuitry to lookup the device database to determine whether the first device identifier and the second device identifier for the electronic device correspond to one of said valid pairings.

(26) A method for providing verification information for verifying whether an electronic device is one of a group of known devices, the method comprising:
obtaining first data dependent on a first device identifier accessible from storage circuitry by a predetermined process executed by the electronic device;
obtaining second data dependent on a second device identifier inaccessible from said storage circuitry by said predetermined process; and
transmitting verification information indicative of the first data and the second data to an enrolment server for verifying whether the first device identifier and the second device identifier corresponds to a valid pairing for one of said group of known devices.

(27) A method for providing verification information for verifying whether an electronic device is one of a group of known devices for which a manufacturer or factory by which the device was made, a hardware configuration of the device, or a mechanism provided on the device at a platform level meets a predetermined property, the method comprising:
obtaining first data dependent on a first device identifier accessible from storage circuitry by a predetermined process executed by the electronic device;
obtaining second data dependent on a second device identifier inaccessible from said storage circuitry by said predetermined process; and
transmitting verification information indicative of the first data and the second data to an enrolment server for verifying whether the first device identifier and the second device identifier corresponds to a valid pairing for one of said group of known devices for which the manufacturer or factory, hardware configuration or mechanism provided at the platform level meets the predetermined property.

(28) The method of any of clauses (26) and (27), wherein the verification information comprises separate indications of the first data and the second data.

(29) The method of any of clauses (26) and (27), wherein the verification information comprises an authentication value determined as a function of the first data and the second data.

(30) The method of any of clauses (26) to (29), wherein the first data is generated by the processing circuitry of the electronic device in dependence on the first device identifier read from storage circuitry of the electronic device.

(31) The method of clause (30), wherein the first data is transmitted by the electronic device to an enrolment device separate from the electronic device, and the verification information is transmitted to the enrolment server by the enrolment device.

(32) The method of any of clauses (26) to (31), wherein the second device identifier is encoded on a label, tag, casing, packaging or screen of the electronic device, or on an instruction manual or receipt associated with the electronic device.

(33) The method of any of clauses (26) to (32), wherein the second device identifier is stored in a region of the storage circuitry inaccessible to said predetermined process.

(34) The method of any of clauses (26) to (33), wherein the second device identifier is read by an enrolment device separate from the electronic device, and the enrolment device generates the second data.

(35) The method of any of clauses (26) to (34), wherein the second device identifier is input by a user of the electronic device, and the electronic device generates the second data.

(36) The method of any of clauses (26) to (35), wherein at least the first data is transmitted to the enrolment server on a protected communication channel.

(37) The method of any of clauses (26) to (36), comprising receiving a freshness providing value generated by the enrolment server, wherein the first data corresponds to a function of the first device identifier and the freshness providing value.

(38) The method of any of clauses (26) to (37), comprising generating at least one cryptographic key for cryptographically identifying the electronic device, and transmitting one of said at least one cryptographic key to the enrolment server.

(39) An apparatus for providing verification information for verifying whether an electronic device is one of a group of known devices, the apparatus comprising circuitry configured to:
  obtain first data dependent on a first device identifier accessible from storage circuitry by a predetermined process executed by the electronic device;
  obtain second data dependent on a second device identifier inaccessible from said storage circuitry by said predetermined process; and
  transmit verification information indicative of the first data and the second data to an enrolment server for verifying whether the first device identifier and the second device identifier corresponds to a valid pairing for one of said group of known devices.

(40) An apparatus for providing verification information for verifying whether an electronic device is one of a group of known devices for which a manufacturer or factory by which the device was made, a hardware configuration of the device, or a mechanism provided on the device at a platform level meets a predetermined property, the apparatus comprising circuitry configured to:
  obtain first data dependent on a first device identifier accessible from storage circuitry by a predetermined process executed by the electronic device;
  obtain second data dependent on a second device identifier inaccessible from said storage circuitry by said predetermined process; and
  transmit verification information indicative of the first data and the second data to an enrolment server for verifying whether the first device identifier and the second device identifier corresponds to a valid pairing for one of said group of known devices for which the manufacturer or factory, hardware configuration or mechanism provided at the platform level meets the predetermined property.

(41) The apparatus of any of clauses (39) and (40), wherein the apparatus comprises said electronic device.

(42) The apparatus of any of clauses (39) and (40), wherein the apparatus comprises an enrolment device separate from said electronic device.

(43) An electronic device manufacturing process, comprising:
  obtaining first data dependent on a first device identifier accessible from storage circuitry by a predetermined process executed by an electronic device;
  obtaining second data dependent on a second device identifier inaccessible from said storage circuitry by said predetermined process; and
  providing authentication information dependent on the first data and the second data to one of the electronic device and an enrolment server for maintaining a database of valid pairings of the first device identifier and the second device identifier for a group of known devices.

(44) An electronic device manufacturing process, comprising:
  obtaining first data dependent on a first device identifier accessible from storage circuitry by a predetermined process executed by an electronic device;
  obtaining second data dependent on a second device identifier inaccessible from said storage circuitry by said predetermined process; and
  providing authentication information dependent on the first data and the second data to one of the electronic device and an enrolment server for maintaining a database of valid pairings of the first device identifier and the second device identifier representing a group of known devices for which a manufacturer or factory by which the device was made, a hardware configuration of the device, or a mechanism provided on the device at a platform level meets a predetermined property.

(45) The process of any of clauses (43) and (44), wherein the authentication information comprises an authentication value determined as a function of the first data and the second data.

(46) The process of any of clauses (43) to (45), wherein the first device identifier is read from storage circuitry of the electronic device.

(47) The process of any of clauses (43) to (45), wherein the first data is obtained without booting the electronic device.

(48) The process of any of clauses (43) to (47), wherein the second device identifier comprises a nonce generated during the manufacturing process.

(49) The process of any of clauses (43) to (48), comprising encoding the second device identifier on a label, tag, casing, packaging or instruction manual for the electronic device.

(50) The process of any of clauses (43) to (48), comprising storing the second device identifier in a region of the storage circuitry inaccessible to said predetermined process.

(51) The process of any of clauses (43) to (50), comprising signing the authentication information with a device manufacturer key and transmitting the signed authentication value to the enrolment server.

(52) Electronic device manufacturing equipment, comprising circuitry to:
  obtain first data dependent on a first device identifier accessible from storage circuitry by a predetermined process executed by an electronic device;
  obtain second data dependent on a second device identifier inaccessible from said storage circuitry by said predetermined process; and
  provide authentication information dependent on the first data and the second data to one of the electronic device and an enrolment server for maintaining a database of valid pairings of the first device identifier and the second device identifier for a group of known devices.

(53). Electronic device manufacturing equipment, comprising circuitry to:
obtain first data dependent on a first device identifier accessible from storage circuitry by a predetermined process executed by an electronic device;
obtain second data dependent on a second device identifier inaccessible from said storage circuitry by said predetermined process; and
provide authentication information dependent on the first data and the second data to one of the electronic device and an enrolment server for maintaining a database of valid pairings of the first device identifier and the second device identifier for a group of known devices for which a manufacturer or factory by which the device was made, a hardware configuration of the device, or a mechanism provided on the device at a platform level meets a predetermined property.

(54) A computer program for controlling a data processing apparatus to perform the method of any of clauses (1) to (23) or (26) to (38) or the process of any of clauses (43) to (51).

(55) A storage medium storing the computer program of clause (54).

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method for verifying whether an electronic device is one of a group of known devices, comprising:
receiving verification information indicative of a first device identifier accessible from a first region of electronic storage circuitry by a predetermined process executed by the electronic device and a second device identifier inaccessible from said electronic storage circuitry by said predetermined process, wherein the first device identifier is accessible by the predetermined process in both a normal processing domain of the electronic device and in a trusted execution environment of the electronic device,
wherein the second device identifier is stored in a secure region of said electronic storage circuitry different from the first region, and wherein the secure region is inaccessible using said predetermined process and the secure region is prevented by a hardware protection mechanism from being accessed in the normal processing domain, and wherein the secure region is accessible in the trusted execution environment using another process; and
looking up a device database representing valid pairings, including a valid pairing of said first device identifier and said second device identifier for said group of known devices, to determine whether the first device identifier and the second device identifier for the electronic device correspond to the valid pairing.

2. The method of claim 1, wherein the device database comprises a database of authentication values, at least one of the authentication values comprising a value of a function of first data dependent on the first device identifier and second data dependent on the second device identifier for one of said group of known devices.

3. The method of claim 2, wherein the verification information comprises a target authentication value received from the electronic device or an enrolment device separate from the electronic device, and the method comprises looking up the target authentication value in the device database.

4. The method of claim 2, wherein the verification information comprises separate indications of the first data and the second data received from the electronic device or an enrolment device separate from the electronic device, and the method comprises generating a target authentication value in dependence on the first data and the second data, and looking up the target authentication value in the device database.

5. The method of claim 1, wherein at least part of the verification information is received from an enrolment device separate from the electronic device.

6. The method of claim 1, comprising transmitting a freshness providing value to the electronic device or an enrolment device separate from the electronic device, and validating the verification information received from the electronic device or the enrolment device to determine whether part of the verification information matches a function of the freshness providing value transmitted to the electronic device or the enrolment device.

7. The method of claim 1, comprising performing an enrolment action for the electronic device, when the electronic device is determined to be one of said group of known devices, or when the electronic device is determined to be one of said group of known devices and the enrolment action has not previously been performed for the electronic device or a predetermined constraint for re-enrolment is satisfied.

8. The method of claim 7, wherein the enrolment action comprises at least one of:
enabling access to a predetermined service by the electronic device; and
storing a cryptographic key received from the electronic device for cryptographically identifying the electronic device.

9. An enrolment server, comprising:
communication circuitry to receive verification information indicative of a first device identifier accessible from a first region of electronic storage circuitry by a predetermined process executed by an electronic device and a second device identifier inaccessible from said electronic storage circuitry by said predetermined process, wherein the first device identifier is accessible by the predetermined process in both a normal processing domain of the electronic device and in a trusted execution environment of the electronic device,
wherein the second device identifier is stored in a secure region of said electronic storage circuitry different from the first region, and wherein the secure region is inaccessible using said predetermined process and the secure region is prevented by a hardware protection mechanism from being accessed in the normal processing domain, and wherein the secure region is accessible in the trusted execution environment using another process;

electronic storage circuitry to store a device database representing valid pairings, including a valid pairing of said first device identifier and said second device identifier for a group of known devices; and processing circuitry to lookup the device database to determine whether the first device identifier and the second device identifier for the electronic device correspond to the valid pairing.

10. A method for providing verification information for verifying whether an electronic device is one of a group of known devices, the method comprising:

obtaining first data dependent on a first device identifier accessible from a first region of electronic storage circuitry by a predetermined process executed by the electronic device;

obtaining second data dependent on a second device identifier inaccessible from said electronic storage circuitry by said predetermined process, wherein the first device identifier is accessible by the predetermined process in both a normal processing domain of the electronic device and in a trusted execution environment of the electronic device, wherein the second device identifier is stored in a secure region of said electronic storage circuitry different from the first region, and wherein the secure region is inaccessible using said predetermined process and the secure region is prevented by a hardware protection mechanism from being accessed in the normal processing domain, and wherein the secure region is accessible in the trusted execution environment using another process; and transmitting verification information indicative of the first data and the second data to an enrolment server for verifying whether the first device identifier and the second device identifier corresponds to a valid pairing for one of said group of known devices.

11. The method of claim 10, wherein the first data is generated by processing circuitry of the electronic device in dependence on the first device identifier read from said first region of electronic storage circuitry of the electronic device.

12. The method of claim 11, wherein the first data is transmitted by the electronic device to an enrolment device separate from the electronic device, and the verification information is transmitted to the enrolment server by the enrolment device.

13. The method of claim 10, wherein the second device identifier is read by an enrolment device separate from the electronic device, and the enrolment device generates the second data.

14. The method of claim 10, wherein the second device identifier is input by a user of the electronic device, and the electronic device generates the second data.

15. An apparatus for providing verification information for verifying whether an electronic device is one of a group of known devices, the apparatus comprising circuitry configured to:

obtain first data dependent on a first device identifier accessible from a first region of electronic storage circuitry by a predetermined process executed by the electronic device;

obtain second data dependent on a second device identifier inaccessible from said electronic storage circuitry by said predetermined process, wherein the first device identifier is accessible by the predetermined process in both a normal processing domain of the electronic device and in a trusted execution environment of the electronic device, wherein the second device identifier is stored in a secure region of said electronic storage circuitry different from the first region, and wherein the secure region is inaccessible using said predetermined process and the secure region is prevented by a hardware protection mechanism from being accessed in the normal processing domain, and wherein the secure region is accessible in the trusted execution environment using another process; and transmit verification information indicative of the first data and the second data to an enrolment server for verifying whether the first device identifier and the second device identifier corresponds to a valid pairing for one of said group of known devices.

16. An electronic device manufacturing process, comprising:

obtaining first data dependent on a first device identifier accessible from a first region of electronic storage circuitry by a predetermined process executed by an electronic device;

obtaining second data dependent on a second device identifier inaccessible from said electronic storage circuitry by said predetermined process, wherein the first device identifier is accessible by the predetermined process in both a normal processing domain of the electronic device and in a trusted execution environment of the electronic device, wherein the second device identifier is stored in a secure region of said electronic storage circuitry different from the first region, and wherein the secure region is inaccessible using said predetermined process and the secure region is prevented by a hardware protection mechanism from being accessed in the normal processing domain, and wherein the secure region is accessible in the trusted execution environment using another process; and providing authentication information dependent on the first data and the second data to one of the electronic device and an enrolment server for maintaining a database of valid pairings, including a valid pairing of the first device identifier and the second device identifier for a group of known devices.

17. Electronic device manufacturing equipment, comprising circuitry to:

obtain first data dependent on a first device identifier accessible from a first region of electronic storage circuitry by a predetermined process executed by an electronic device;

obtain second data dependent on a second device identifier inaccessible from said electronic storage circuitry by said predetermined process, wherein the first device identifier is accessible by the predetermined process in both a normal processing domain of the electronic device and in a trusted execution environment of the electronic device, wherein the second device identifier is stored in a secure region of said electronic storage circuitry different from the first region, and wherein the secure region is inaccessible using said predetermined process and the secure region is prevented by a hardware protection mechanism from being accessed in the normal processing domain, and wherein the secure region is accessible in the trusted execution environment using another process; and provide authentication information dependent on the first data and the second data to one of the electronic device and an enrolment server for maintaining a database of valid pairings, including a valid pairing of the first device identifier and the second device identifier for a group of known devices.

18. A non-transitory storage medium storing a computer program for controlling a data processing apparatus to perform the method of claim 1.

* * * * *